United States Patent [19]

Anderson

[11] 4,019,564
[45] Apr. 26, 1977

[54] CASTING SUPPORT FOR AUTOMATIC CAST TRIM MACHINES

[76] Inventor: Victor O. Anderson, 17250 S. Main St., Gardena, Calif. 90248

[22] Filed: Nov. 5, 1975

[21] Appl. No.: 628,992

[52] U.S. Cl. .............................. 164/271; 164/269; 164/344
[51] Int. Cl.² ....................................... B22D 17/22
[58] Field of Search .......... 164/262, 265, 269, 344, 164/347, 271; 425/250, DIG. 58

[56] References Cited

UNITED STATES PATENTS

| 2,217,661 | 10/1940 | Anderson | 164/347 X |
| 2,279,344 | 4/1942 | Reid | 425/250 X |
| 2,409,142 | 10/1946 | McCoy | 425/DIG. 58 |
| 3,547,181 | 12/1970 | Lewis | 164/265 |

*Primary Examiner*—Robert D. Baldwin
*Attorney, Agent, or Firm*—Blakely, Sokoloff, Taylor & Zafman

[57] ABSTRACT

A casting support for use in automatic cast trim machines having improved casting retention characteristics and being suitable for use in machines having a simple rail for the return of spiders to the melting pot. This support is characterized by a projection supporting an enlarged end about which the casting is formed, with suitable regions adjacent the projection to provide positive locking of the extensions of the casting around the projection to prevent separation of the casting in that area and the resulting loosening thereof upon the rotation of the index mechanism in the cast trim machine. Shrinking of the casting during cooling in combination with the locking of the casting provides positive orientation of the casting on the support, yet ready removal thereof by a simple punch.

13 Claims, 9 Drawing Figures

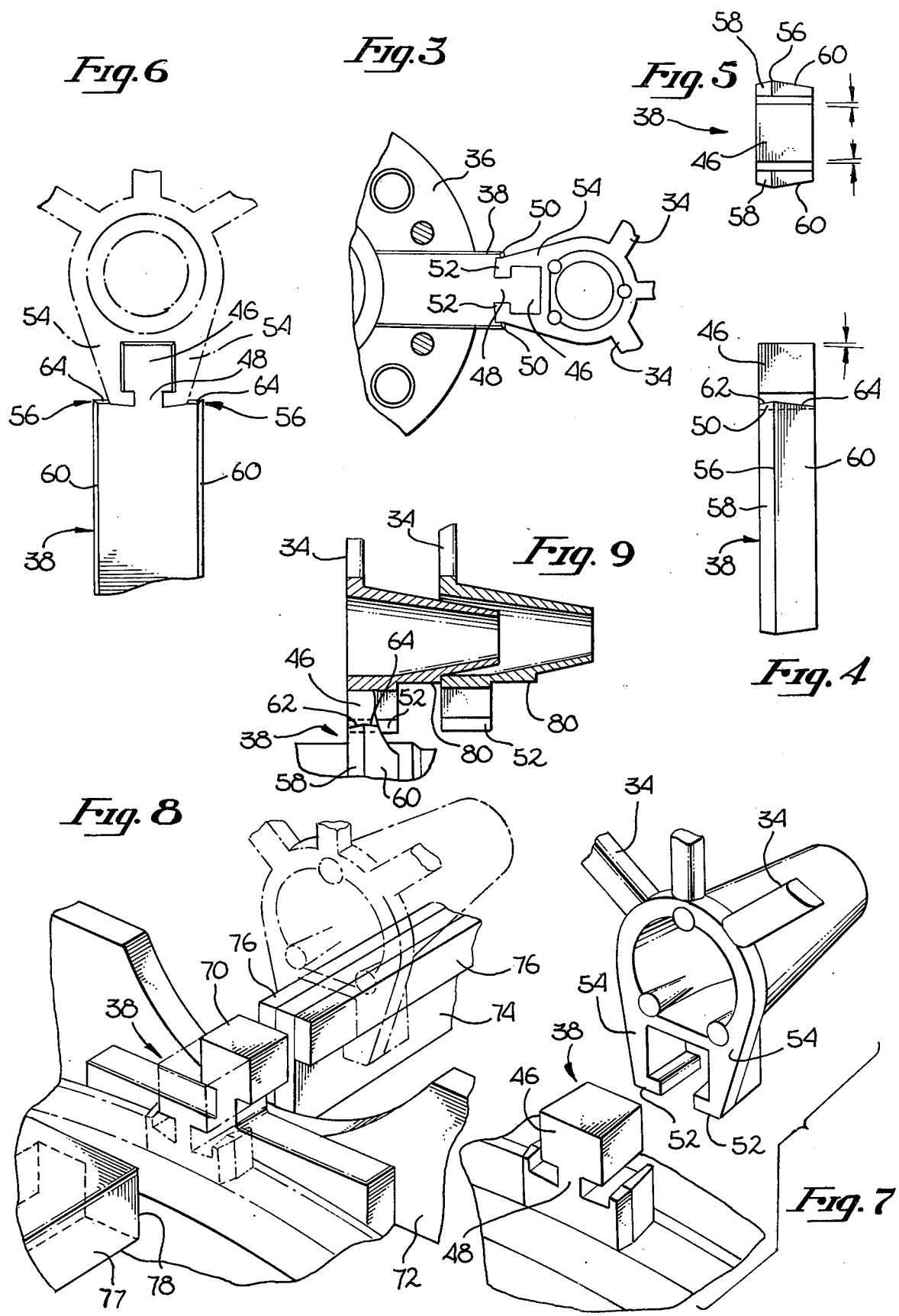

CASTING SUPPORT FOR AUTOMATIC CAST TRIM MACHINES

BACKGROUND OF THE INVENTION

1. Field of the Invention

The present invention relates to the field of casting and molding machines, and more particularly to die casting machines of the automatic cast trim type whereby castings are formed and automatically punched from the spider.

2. Prior Art

Until recent years die casting machines were generally adapted to provide one or more die cast parts coupled to a spider formed by the flow paths supplying the die cast metal to the mold cavities. Such machines are characterized as having a stationary platen supporting one mold half and a movable platen supporting the other mold half, with an injector supplying the molten metal to the cavity when the two mold halves are closed. Typically the mold is designed so that the casting hangs up in one mold half, with ejector pins being provided to break the castings and spider loose from that mold half when the mold is opened. An operator would then reach between the mold halves to remove the casting, with the cast parts later being punched from the spider at a separate punch station and the spider remelted for recovery of the metal.

Recently new legal requirements, cost of labor and other considerations have resulted in the development and introduction of automatic cast trim machines whereby a single machine forms the casting and punches the cast parts from the spider automatically. In such machines the closed mold cavity is formed not only by two mold halves, but in addition by a support member typically in the sprue region at one edge of the mold so that the casting embraces the support member in some manner for support after separation of the casting from the mold. The support in turn is coupled to some form of index mechanism so that it may be rotated or otherwise transported through a series of stations, including a punch station for punching the cast parts from the spider, and a casting spider removal station for removal of the spider from the support member to complete the cycle.

Typical support members may include a single spud around which a part of the casting is formed, with the spider removal being achieved by simply forcing the casting off the end of the spud. Such a support member is disclosed in U.S. Pat. No. 3,547,181. This spud has certain advantages, including the fact that the casting entirely surrounds the periphery of the spud so that the shrinking of the casting during cooling provides firm locking pressure between the casting and the spud. Of course geometries other than purely round may be used to provide good angular indexing for rotation, if required, as in the foregoing patent. Similarly stripping of the spider from the spud may be positively accomplished, though in the foregoing patent the overall structure has the disadvantage of requiring removal of the casting in a direction which is orthogonal to the normal platen motion. Further, once the spider is stripped from the support spud in such a system, there is no convenient way of locating the spider with respect to any means for transporting the spider back to the pot.

Another type of automatic cast trim machine is that of my co-pending application, Ser. No. 352,126, entitled "Automatic Casting Machine". This type of machine is of a horizontal structure rather than a vertical structure of U.S. Pat. No. 3,547,181, and has among its advantages the advantage that the relative location of the punch and die set may be reversed as desired so that the rotation of the spiders in a transverse axis is not required. While a casting support similar to that of the foregoing patent could be used, a simple basically two-dimensional casting support (neglecting the draft) allows for a simple punch-off of the spider as a normal application of the platen motion. The two dimensional support member also provides the advantage of allowing easy and automatic orientation of the casting spiders on a simple rail or track for guidance back to the pot.

The two dimensional support has a number of very substantial advantages. However, the two dimensional supports as were known prior to the present invention did not provide the rigidity desired, and sometimes required, of such devices. In particular, if the support is shaped so that the casting shrinks away from the support, the casting has the basic form of an open channel around the support, with the result that the channel sometimes opens up somewhat on shrinkage and indexing to result in undesired looseness between the casting and the support. If the support has an opening into which part of the casting is formed, the shrinkage of the casting tends to automatically result in some looseness of the casting on the support, and further, unless a large support is used so as to define a cavity taking a large amount of metal, the casting will be weak in this area and thus fail to provide the desired strength and rigidity.

BRIEF SUMMARY OF THE INVENTION

A casting support for use in automatic cast trim machines having improved casting retention characteristics and being suitable for use in machines having a simple rail for the return of spiders to the melting pot. The support is characterized by a substantially two-dimensional projection supporting an enlarged end about which the casting is formed. Suitable regions spaced from a neck of the projection provide positive locking of the extensions of the casting around the projection to prevent separation of the casting in that area, and the resulting loosening therof upon the rotation of the index mechanism in the cast trim machine. Shrinking of the casting during cooling in combination with the locking of the casting provides tension in the casting in that area resulting in positive orientation of the casting on the support, yet ready removal by a simple punch operative with the moving platen to punch the casting off of the projection. A simple T-shaped rail may receive the casting from the casting support member for retention and guidance of the castings as desired.

BRIEF DESCRIPTION OF THE DRAWINGS

FIG. 3 is a face view of a casting support with a casting thereon.

FIG. 4 is a side view of one embodiment of the casting support of the present invention.

FIG. 5 is a top view of the casting support of FIG. 4.

FIG. 6 is a face view of the casting support of FIG. 4.

FIG. 7 is a perspective view of a casting support and casting in accordance with the present invention.

FIG. 8 is a perspective view of the various parts making up a typical spider removal station in an automatic cast trim machine.

FIG. 9 is a cross section view illustrating the abutting of adjacent castings as they slide along the rail.

DETAILED DESCRIPTION OF THE INVENTION

Figure 1:
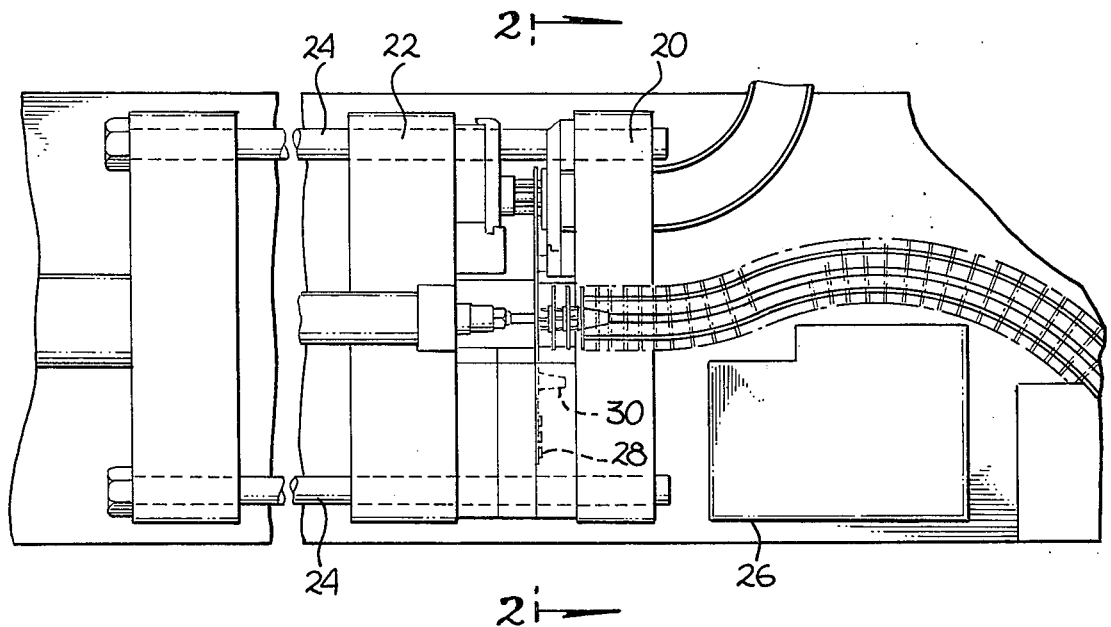
FIG. 1 is a top view of one form of cast trim machine which may utilize the present invention.
Figure 2:
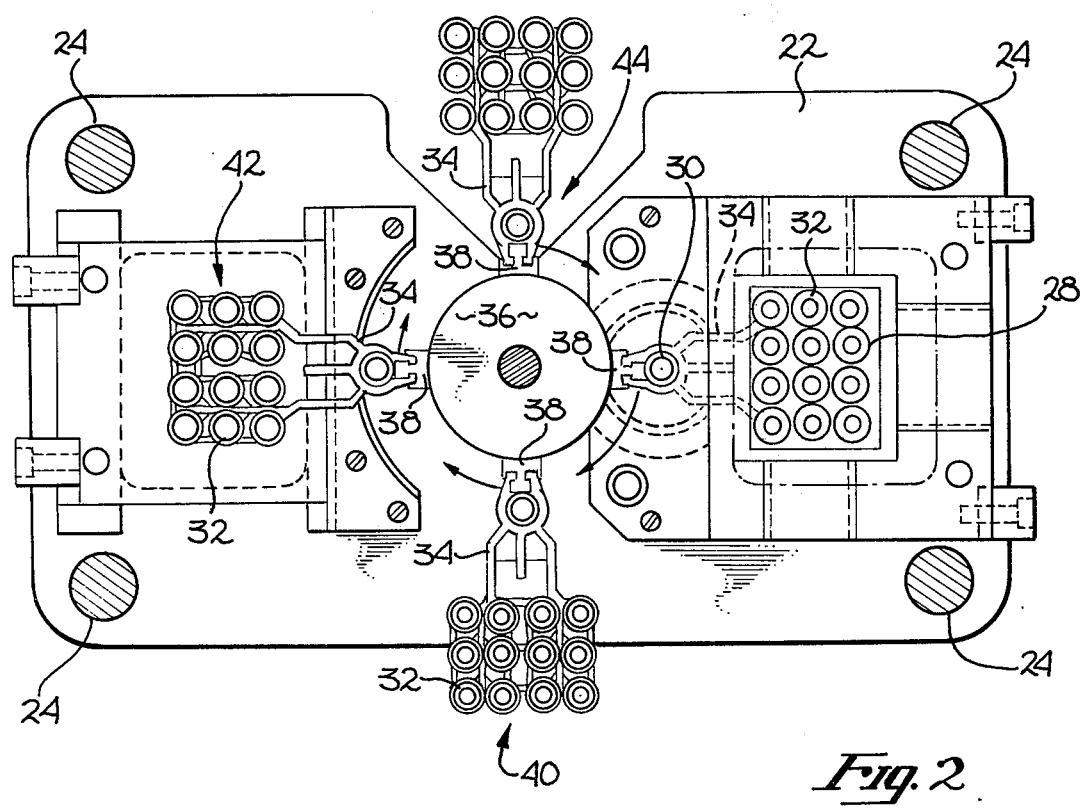
FIG. 2 is a partial cross section of the machine of FIG. 1 taken along line 2—2 of that figure.

First referring to FIGS. 1 and 2, a top view and a partial cross sectional view of a prior art cast trim machine utilizing the present invention may be seen. The machine illustrated is the subject of my co-pending application, Ser. No. 352,126 filed Apr. 18, 1973, now U.S. Pat. No. 3,951,202 issued Apr. 20, 1976, entitled "Automatic Casting Machine". The machine has a stationary platen 20 and a moving platen 22 disposed on tie bars 24 and movable with respect to the stationary platen in a horizontal direction. An injector mechanism 26, schematically represented in FIG. 1, supplies the molten metal to the mold cavity 28 though a sprue 30, with the various molded parts 32 ultimately being supported by a resulting spider 34. A center indexing assembly, generally indicated by the numeral 36, carries a plurality of casting support members 38 which form part of the closed mold cavity, and onto which part of the casting is formed so that the resulting casting will be supported thereby. The indexing assembly 36 supports the casting by the casting support members when ejected from the mold cavity, and successively rotates through 90° angularly increments, to a lower station generally indicated by the numeral 40 for cooling of the casting, to a punch station generally indicated by the numeral 42 for punching the parts from the spider, and a spider removal station generally indicated by the numeral 44 for removing the spider 34 from the casting support members 38. In cast trim machines having a cooling station such as station 40 in the machine illustrated in FIGS. 1 and 2, the indexing to the cooling station is not critical. However the further indexing to the punch station is critical, as the cast parts must be accurately aligned with the punch and die set if the desired result is to be consistently achieved. This requires not only the accurate indexing by the indexing assembly 36 to provide precise and repeatable location of the casting support members 38 and the punch station, but also requires that the casting spider be accurately and rigidly retained by the casting support member. It is this purpose to which the present inventon is directed.

Now referring to FIG. 3, one of the key aspects of the present invention casting support member may be seen. This figure is a view of one of the casting support members and associated structure of FIG. 2, taken on an expanded scale, and illustrates the casting support member 38 mounted on the indexing assembly 36 and supporting one of the casting spiders 34. The casting support member 38 is characterized by a head portion 46 and a smaller neck portion 48, with protrusions 50 extending from the sides of the casting support member outward and spaced from the neck portion 48 to provide channel-like cavities between the neck portion 48 and each tab 50. In essence, these tabs 50 provided retaining members or locking members to confine the base regions 52 of the casting below the head 46 of the casting support member and adjacent the neck region 48 thereof. The net result is as follows: when the casting is formed (with the outer surfaces of the casting support member being defined by the combination of the two mold halves) integral side legs 54 and base regions 52 are formed about the head and neck of the casting support member. As the casting cools and shrinks, the base regions 52 are confined within the position shown by the locking projections 50 so that the shrinkage of the side legs 54 creates substantial tension therein to lock the casting firmly and rigidly on the casting support member. As shall subsequently be seen in greater detail, the casting may be longitudinally pushed off of the casting support member, and by providing proper draft of the support member, the desired locking action is achieved and yet the casting will release during the initial travel when being stripped. It should also be noted that with the casting support member shown in FIG. 3, there is a substantial separation between the two side legs 54, providing maximum stiffness in the support and high strength and rigidity to provide the angular acceleration and deceleration of the casting as the index head indexes between the various stations. Thus it may be seen that the key aspects of the present invention are a fundamentally two-dimensional member extending into the closed mold cavity to define a portion thereof so that a portion of the casting is formed around the two-dimensional member with a provision for a cast-in locking arrangement for locking the extremeties of the casting cast around the support member so that shrinkage of the casting encourages an even tighter coupling of the casting to the casting support member. (The casting support member is basically a two-dimensional member in that the variation in planform through the thickness of the casting support member is due only to draft to provide better casting release and to guide the casting support member between the two mold halves).

Now referring to FIGS. 4, 5 and 6, a side view, top view and face view of the casting support member of the present invention may be seen. The casting support member 38 could locate at any position on the casting spider in relation to the sprue though, for various reasons, it is preferable to locate and support the casting immediately adjacent the sprue as representing a conveniently disposed central tie point of significant structure. Accordingly, since the sprue is located primarily in the stationary mold half (e.g., adjacent the injector), and in order to assure ample length for the connection between the casting and the casting support member, the parting line 56 is located adjacent the moving platen side of the casting support member. Accordingly the parting line 56, as visible in FIGS. 4 and 5, is disposed toward one side of the casting support member, with the side portions 58 and 60 which mate with the mold halves on closing of the mold having a draft of approximately 5° for clearance and guidance during mold closure. This 5° draft also is provided on the surfaces 62 and 64 and on the locking tabs 50, as these surfaces are also abutted by the two mold halves on closure of the mold (for reference, a portion of the casting is shown in phantom in FIG. 6 to illustrate its extent in relation to the specific configuration of the casting support member). The surfaces of the casting support member head 46, on the other hand, are preferably provided with a draft of approximately 2° running from the larger end facing the movable mold half to the smaller end thereof at the side adjacent the stationary mold half, so that the casting will release from the head during the initial movement while being pressed off of the casting support member. A similar draft may be provided in the neck region if desired, though the draft on the casting abutting surfaces should not be excessive because of the need for a locking taper in these regions to assure positive retention of the casting. Also it should be noted in the foregoing description that the extent of the locking tabs 50 is relatively limited. While larger locking tabs could be used, it is preferable to avoid small cross-sections or locking surfaces which are larger than necessary so as to avoid breakage during indexing or while being pressed off at the spider removal station. A perspective view of the casting support member and a sprue may be seen in FIG. 7 which shows the drafts on the various parts, the parting lines and the resulting shape of the sprue.

Now referring to FIG. 8, a perspective view of the various key components making up the spider removal station may be seen. When the index mechanism indexes the casting support member 38 to the spider removal station, the casting support member indexes to a position immediately in front of a backup member 70, supported by plate 72 fastened to the stationary platen. The backup member 70 has a cross-section very similar to the head and neck region of the casting support member, being somewhat smaller in overall dimensions so as to allow the free passage of the spider thereover while confining its translational motion with respect thereto. Located behind the backup member 70 is a rail, comprising a center portion 74 and top side plates 76 which may be welded or riveted to the center member 74, again to generally duplicate the cross-section of the casting support member, though smaller in dimension to allow the sliding free passage thereover. The punch 77 coupled to the moving platen has a generally horse-shoe shaped end 78 to straddle the casting support member and to punch the casting therefrom upon the closure of the mold halves. Accordingly, upon the closure of the mold halves preparatory to the shooting of a new casting, the punch 77 punches the casting at the spider removal station off of the casting support member and onto the rail for guidance back to the pot. In this regard FIG. 9 shows the relative location of two spiders on the rail, and more particularly the extension 80 of the sprue region which provides a pushing member for abutting the adjacent casting just above the opening left by the casting support member so as to space the tapered sprue regions by an amount sufficient to allow the rail to run through a radius as may be required to guide the castings back to the pot without any finging of adjacent sprues. Thus, because the castings which are captured by the rail are sufficiently spaced to negotiate reasonable turns and encourage one another to slide along the rail by contact at a point immediately adjacent the rail, the castings are freely yet positively directed along the path of the rail to the pot.

The present invention has been specifically described with respect to a preferred embodiment particularly useful with respect to the cast trim device of the copending patent application entitled "Automatic Casting Machine", Ser. No. 352,126, filed on Apr. 18, 1973. However, the present invention may readily be used with respect to other cast trim devices, such as by way of example that of U.S. Pat. No. 3,547,181. The essential feature is that the casting be formed around a casting support member which is substantially two-dimensional, neglecting draft angles, and which further includes a locking means for locking the casting around the casting support member so that shrinkage of the casting during cooling assures firm and positive location of the casting with respect to the casting support member, yet easy removal through a simple punching operation by a punch mounted on the moving platen. Suitable locking means include regions at the sides of the casting support member which have entrances of reduced cross-sectional areas so as to entrap the resulting casting in those regions, as in the embodiment specifically described. Thus while the preferred embodiment has a pronounced step between the neck region 48 and projections 64, gradual tapers to regions of increased thickness adjacent the "neck" region, or other geometric shapes may be used, provided the net effect is to entrap the casting at each side of the casting support member. Also, of course other transport means, such as conveyors and the like, can be used for the return of the sprues to the pot as desired. While the preferred embodiment of the present invention has been disclosed and described in detail herein, it will be understood by those skilled in the art that various changes in form and detail may be made therein without departing from the spirit and scope of the invention.

I claim:

1. A casting support for an automatic cast-trim machine comprising a member for fitting between the stationary platen and the moving platen to define part of the closed mold cavity, said member having means for mounting said member to an indexing system, said member having first and second faces for face to face disposition with the stationary platen and moving platen mold halves, respectively, said member having an outer extension with first and second sides for extending into the mold cavity about which a casting may be formed, said member having on each of said first and second sides a means for entrapping a portion of a casting formed about said member and preventing said portion of the casting from spreading away from said outer extension, whereby said casting will be encouraged into tight grip on said outer extension upon cooling and shrinkage of the casing.

2. The casting support of claim 1 wherein said outer extension is tapered between said first and second faces to a smaller profile at said stationary platen, whereby a punch coupled to the moving platen may easily force a casting off said casting support.

3. In a cast-trim machine, an improved casting support member for defining a portion of the closed mold cavity and for supporting the resulting casting for transport to at least one subsequent station comprising:
a member for extending into a closed mold cavity and having first and second opposite faces for face to face disposition with first and second mold halves respectively, said member having an outermost portion for extending furthest into the mold cavity so that a casting may extend around opposite sides of the outermost portion, means for locking the portion of a casting extending around the sides of the outermost portion to said support member, and means for preventing said portion of a casting from spreading and loosening in fit around said outermost portion of said casting support member.

4. The casting support member of claim 3 wherein said means for locking the portion of a casting extending around the sides of the outermost portion comprises regions for defining a portion of the mold cavity each having an entrance of smaller cross-sectional area than the respective area, whereby the part of the casting formed in said regions will resist withdrawal therefrom.

5. The casting support member of claim 3 wherein said means for preventing said portion of a casting from spreading and loosening in fit around said outermost portion of said casting support member comprises projections from each side of said casting support member extending outward into the mold cavity and spaced apart from said outermost portion.

6. In a casting machine having a transport system for transporting castings from a mold station to at least one other station, the improvement comprising the combination of first and second mold halves and a casting support member mounted on a transport system for transport from a first position adjacent said first and second mold halves to at least one additional station, said first and second mold halves closing on a parting line to define a mold cavity having an opening into which said casting support member extends, said casting support member fitting within and substantially closing said opening, said casting support member having first and second parallel spaced apart faces for face to face disposition with said first and second mold halves, said casting support member having a head-like extension into said mold cavity supported by a narrower neck region whereby a casting may be formed extending at least part way around said head region, said casting support member further having protrusions spaced from said neck region to provide channel-like cavities to lock a casting around said neck region, said casting support member within the mold cavity having a substantially uniform cross section whereby a casting may be forced off said casting support member by a force in the direction of the mold closure.

7. The improvement of claim 6 wherein the sides of said head-like extension of said casting support member have a uniform draft running from said first face to said second face.

8. In a cast-trim machine, an improved casting support member for defining a portion of the closed mold cavity and for supporting the resulting casting for transport to at least one subsequent station comprising:
a member having first and second opposite faces for close face to face disposition with first and second mold halves respectively, in a closed mold, said member having an outer section extending into the mold cavity with first and second opposite sides extending between said first and second opposite faces and about which part of a casting may be formed, said member further having projections extending outward into the mold cavity and spaced from said outer section, forming channel-like regions at each side of said outer section and extending between said first and second opposite faces and into which a further part of a casting may be formed, said channel-like regions providing regions of increased section in the resulting castings whereby a resulting casting becomes locked by said channel-like regions and said projections against removal from said casting support member except in a direction parallel to said channel-like regions.

9. The casting support member of claim 8 wherein said channel-like regions are formed in part by a neck region supporting said outer section, said neck region being narrower than said outer section whereby the resulting casting will reach partially around said outer section, said projections locking the respective portion of a resulting casting in said neck region.

10. The casting support member of claim 8 wherein the sides of said outer section of said csting support member have a uniform draft running from said first face to said second face.

11. The casting support member of claim 8 wherein each face of said outer section is substantially rectangular.

12. The casting support member of claim 8 wherein said casting support member is a one piece member.

13. The casting support member of claim 8 wherein said first and second opposite faces are substantially flat parallel faces.

* * * * *